Aug. 22, 1944.  DE WITT CLAUSEN  2,356,506
SPINDLE MOUNTING
Filed Oct. 9, 1942
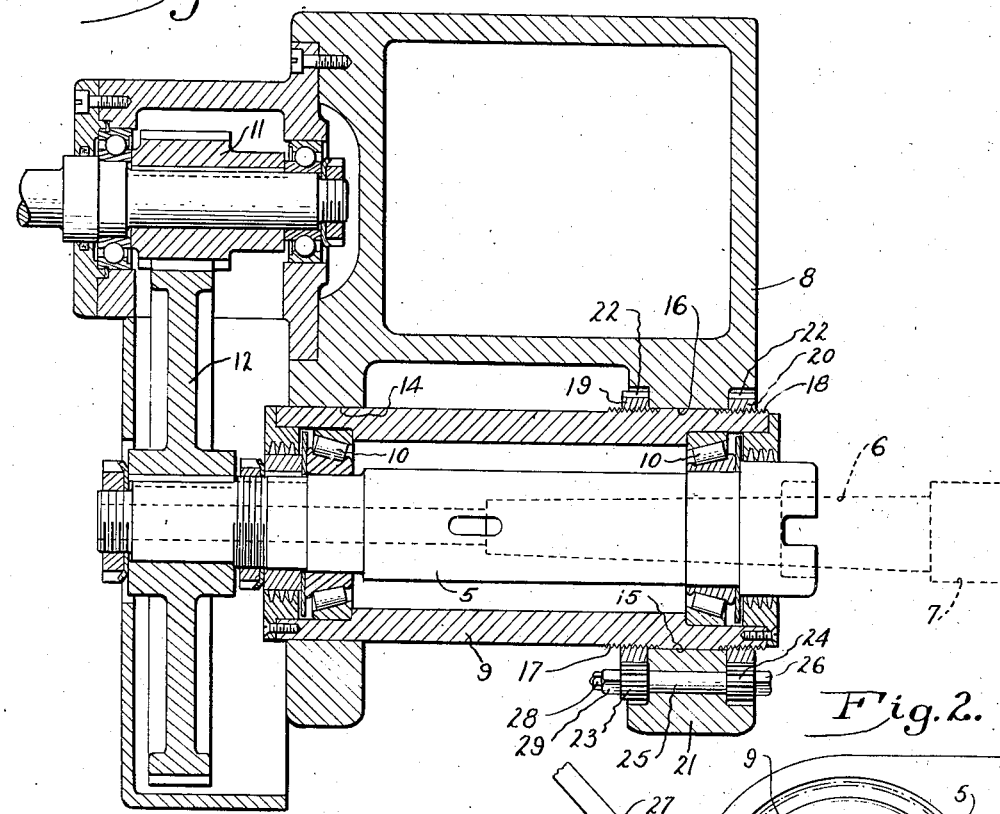
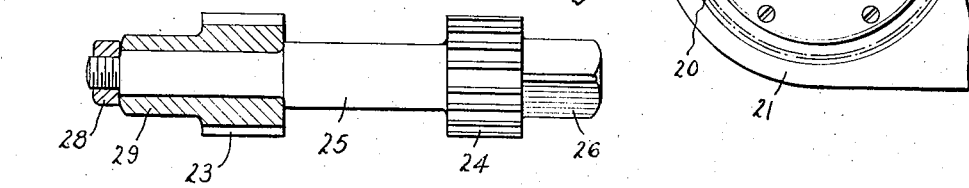
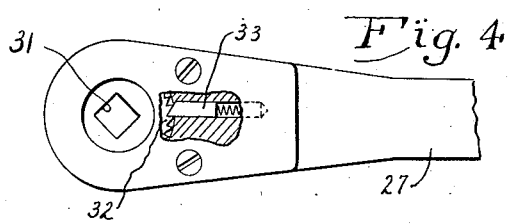
INVENTOR
DeWitt Clausen
BY
ATTORNEYS Patented Aug. 22, 1944

2,356,506

UNITED STATES PATENT OFFICE 2,356,506

SPINDLE MOUNTING

De Witt Clausen, Chicago, Ill., assignor to Lucien I. Yeomans, Inc., Chicago, Ill., a corporation of Illinois Application October 9, 1942, Serial No. 461,475

6 Claims. (Cl. 308—207)

This invention relates to the mounting of spindles for cutters and the like and the general object is to provide a mounting which is simple and rugged in construction and which is easy to adjust axially with extreme precision.

A more detailed object is to provide a screw and nut adjustment for a spindle having a novel mechanism for actuating the parts to effect the adjustment and clamping of the spindle in its adjusted position.

Other objects and advantages of the invention will become apparent from the following detailed description taken in connection with the accompanying drawing, in which Figure 1 is a fragmentary vertical sectional view of a machine tool spindle and its mounting embodying the novel features of the present invention.

Fig. 2 is an end view.

Fig. 3 is an enlarged view partially in section of the actuating mechanism for the adjusting nuts.

Fig. 4 is a fragmentary plan view of a ratchet wrench.

While the invention is susceptible of various modifications and alternative constructions, I have shown in the drawing and will herein describe in detail the preferred embodiment. It is to be understood, however, that I do not intend to limit the invention by such disclosure, but aim to cover all modifications and alternative constructions falling within the spirit and scope of the invention as expressed in the appended claims.

In the illustrated embodiment, 5 indicates a spindle for receiving the shank 6 of a cutter 7 and supporting the same in the frame structure 8 of a machine tool. The spindle extends through a sleeve 9 and is supported therein against endwise movement by tapered roller bearings 10. Rotary power is transmitted to the spindle through a pinion 11 and a gear 12 on the projecting rear end of the spindle. The pinion may be wider than the gear to allow for full meshing of the two over the range of axial adjustment of the spindle. To support the spindle for axial adjustment, the rear end of the sleeve is slidable in a bore 14 in the frame 8 and a portion 15 of the forward end of the sleeve is slidable in a bore 16 in an arm 21 of the frame.

On opposite sides of its external bearing surface 15, the spindle is formed with external threads 17 and 18 of the same lead onto which are threaded nuts 19 and 20 which may be tightened against opposite sides of the arm 21 to clamp the sleeve and spindle against endwise movement. Preferably, opposite sides of the arm are recessed to receive the nuts.

To adjust the nuts 19 and 20 axially of the sleeve, means comprising a pair of independently operable adjustable elements is provided. For this purpose the nuts are formed externally with spur gear teeth 22 which mesh with adjusting elements in the form of pinions 23 and 24 both carried in this instance on a shaft 25 which is journaled in the lower end of the frame arm 21 and extends parallel to the spindle. The pinion 24 is fast on the shaft and the projecting end 26 of the latter is squared or otherwise contoured to fit in the socket of a wrench 27, preferably of the ratchet type by which the shaft 25 and the pinion may be turned to loosen or tighten the nut 20. The pinion 23 for turning the nut 19 is loose on the other end portion of the shaft 25 on which it is held by a nut 28. The latter is smaller than a squared end 29 formed integral with the pinion 23 and adapted to be received in the socket of a similar ratchet wrench 30. The ratchet wrenches when coupled to the squared ends 26 and 29 thus constitute cranks each having a one-way connection with one of the pinions which may be advanced step by step by swinging of the crank back and forth. The wrenches 27 and 30 may be of well known construction as shown in Fig. 4 having a socket 31 for receiving one of the squared heads 26 or 29, a rotary ratchet wheel 32 carrying the socket, and a pawl 33 carried by the handle and adapted to be rendered operative selectively depending on the direction of turning in which the wrench is to be effective.

By virtue of the substantial reduction in the wrench motion effected through each pinion and nut gear coupled with the screw thread type of adjusting mechanism, it will be apparent that the spindle may be advanced axially in fine increments by manipulation of the wrenches 27 and 30 thereby enabling precise adjustment to be obtained easily. Such adjustment may be effected quickly and conveniently by applying both wrenches to the nut ends 26 and 29 and manipulating these to advance the pinions 23 and 24 alternately in the same direction.

For example, if the spindle is to be advanced outwardly, the wrench 30 would first be raised, thereby loosening the nut 19. Then, while lowering this wrench to pick up the next tooth, the other wrench 27 would be raised through the same angle thereby tightening the nut 20 and thus drawing the spindle sleeve outwardly through the support 21 and bringing the loosened nut 20 against the support. By grasping the wrenches in his different hands, an operator may easily move the two in alternation thereby advancing the spindle axially until the desired cutter position has been attained. At this point, the nut 19 is tightened against the frame arm thereby locking the sleeve 9 in place. To adjust the spindle reversely, the same procedure is followed except that the active strokes of the wrenches are reversed and the wrench 27 is first moved to loosen and retract the nut 19 prior to advance of the sleeve by tightening of the nut 20 to draw the sleeve forwardly.

It will be observed that the adjustable mounting thus provided is extremely simple in construction and yet provides for precise adjustment and firm clamping of the spindle in the frame.

I claim as my invention:

1. A spindle mounting having, in combination, a sleeve rotatably supporting the spindle, a member slidably supporting said sleeve for axial adjustment, said sleeve being externally threaded on opposite sides of said member, spur gears threaded onto said sleeve threads to clamp the sleeve to said member, a shaft journaled in said member parallel to said sleeve, a pinion fast on said shaft and meshing with one of said gears, a pinion loose on said shaft and meshing with the other gear, and means on said pinions for engaging tools by which the pinions may be turned.

2. A spindle mounting having, in combination, a sleeve rotatably supporting the spindle, a member slidably supporting said sleeve for axial adjustment, said sleeve being externally threaded on opposite sides of said member, spur gears threaded onto said sleeve threads to clamp the sleeve to said member, two coaxially arranged pinions mounted on said member in mesh with the respective gears, and means on said pinions for engaging tools by which the pinions may be turned independently.

3. A mounting for a rotary spindle having, in combination, a support, a member shiftable axially on said support and providing a journal for said spindle, nuts threaded onto said member to clamp the same to said support, said nuts having external gear teeth, pinions rotatably mounted on said support for independent rotation and meshing with said gear teeth, and means on said pinions whereby they may be engaged and rotated.

4. A mounting for a rotary spindle having, in combination, a support, a member shiftable axially on said support, nuts threaded onto said member to clamp the same to said support, said nuts having external gear teeth, and coaxially arranged pinions rotatably mounted on said support in mesh with the teeth of the respective nuts.

5. A spindle mounting having, in combination, a support, a member slidable on said support and rotatably supporting a spindle, nuts threading onto said member on opposite sides of said support, said nuts having peripheral gear teeth, and gears meshing with said teeth.

6. A spindle mounting comprising a supporting arm having a transverse bore, a spindle supporting sleeve movable axially in said bore, nuts threaded on said sleeve and engageable with opposite sides of the supporting arm to hold said sleeve against axial movement, and means for rotatably adjusting said nuts on said sleeve comprising a pair of adjusting elements respectively disposed on opposite sides of said arm.

DE WITT CLAUSEN.